Oct. 22, 1929.  L. E. PITTONI  1,732,588
SPRING CONSTRUCTION
Filed Sept. 14, 1927  2 Sheets-Sheet 1

INVENTOR
LOUIS E. PITTONI
BY
John E. Hubbell
ATTORNEY

Oct. 22, 1929.  L. E. PITTONI  1,732,588
SPRING CONSTRUCTION
Filed Sept. 14, 1927  2 Sheets-Sheet 2
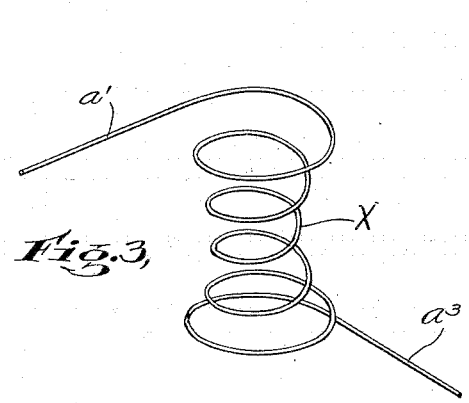
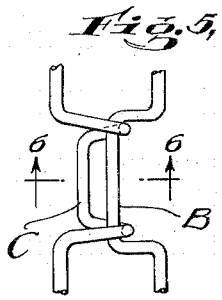
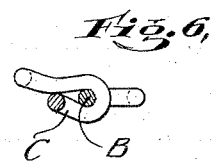
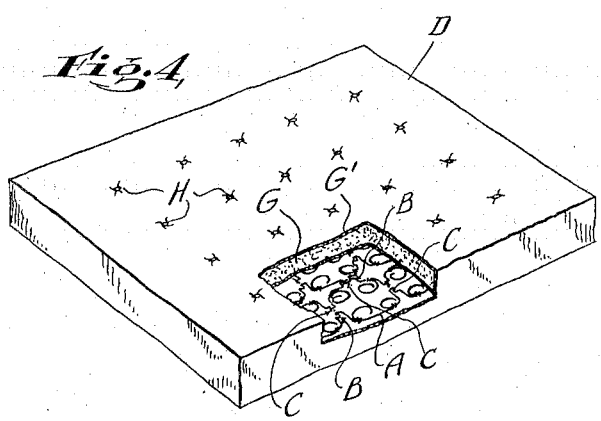
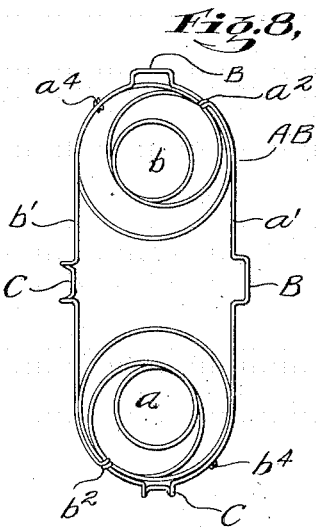
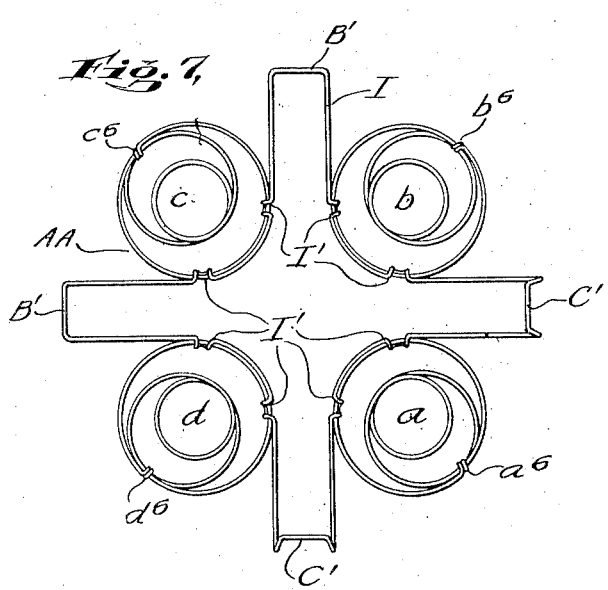
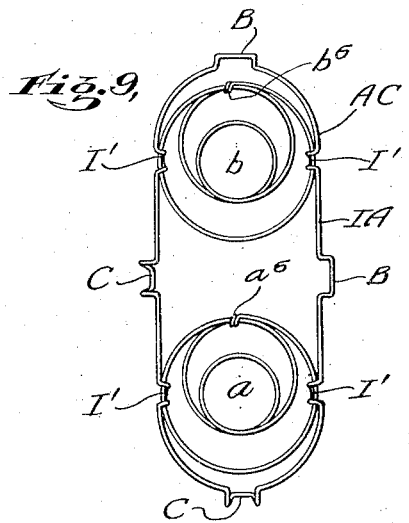
INVENTOR
LOUIS E. PITTONI
BY
John E. Hubbell
ATTORNEY Patented Oct. 22, 1929

1,732,588

UNITED STATES PATENT OFFICE

LOUIS E. PITTONI, OF JAMAICA, NEW YORK, ASSIGNOR TO THE ROME COMPANY, INC., OF ROME, NEW YORK, A CORPORATION OF NEW YORK

SPRING CONSTRUCTION

Application filed September 14, 1927. Serial No. 219,396.

The general object of my present invention is to provide an improved spring construction especially adapted for use in spring filled mattresses and other spring cushions, and in upholstering work where yielding spring backed surfaces are employed. A more specific object of the invention is to provide a self contained self sustaining spring unit which is well adapted for such uses as those mentioned above, and is mechanically simple and strong, and relatively inexpensive to produce and which can be readily and effectively combined with similar units to form a spring structure composed of a multiplicity of connected units.

My improved spring unit is structurally characterized by the fact that it comprises a plurality of helical spring bodies arranged side by side and each connected at one end to a common end frame, and in preferred constructions, the various spring bodies of each unit extend between an opposing pair of end frames to which the opposite ends of each body are connected. Each end frame may be formed by connecting integral end extensions of each helical spring body to the other spring body or bodies of the unit, or it may be formed of a separate wire or wires secured to the end convolutions of the spring bodies of the unit. In any event, the end frames preferably possess sufficient flexibility to yield in a proper manner to pressure applied to the unit and causing the helical spring bodies thereof to collapse more or less, and are sufficiently strong and resilient to return the unit to its original form when the collapsing pressure applied to the latter is removed.

The various features of novelty which characterize my invention are pointed out with particularity in the claims annexed to and forming a part of this specification. For a better understanding of the invention, however, its advantages and specific objects attained by its use, reference should be had to the accompanying drawings and descriptive matter in which I have illustrated and described preferred embodiments of the invention.

Of the drawings:

Fig. 3 is a perspective view of a spring blank;

Fig. 4 is a perspective view partly broken away and in section of a mattress;

Fig. 5 is a plan view of portions of two connected spring units;

Fig. 6 is a section on the line 6—6 of Fig. 5;

Fig. 7 is a plan view of a second form of spring unit;

Fig. 8 is a plan view of a third form of spring unit; and

Fig. 9 is a plan view of a spring unit differing slightly from that shown in Fig. 8.

Figure 1:
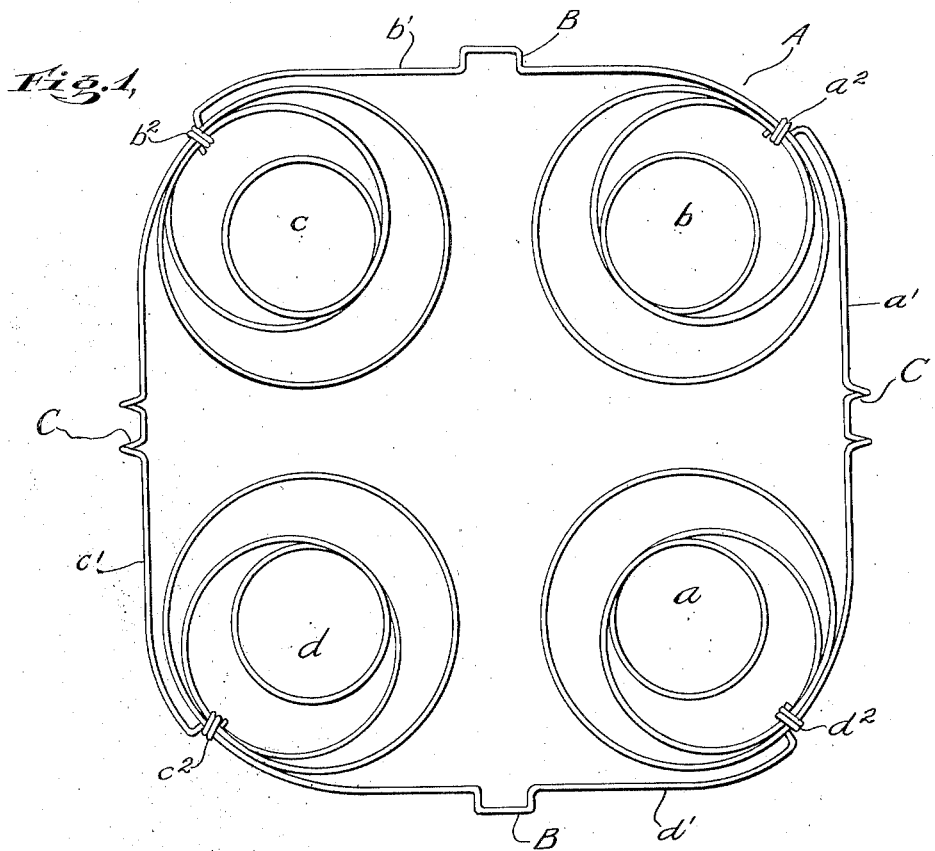
Fig. 1 is a plan view of a spring unit.
Figure 2:
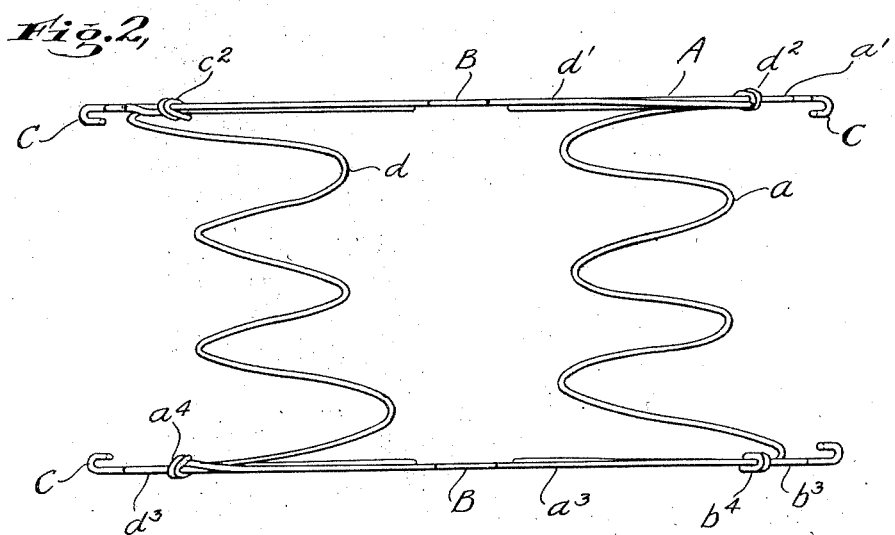
Fig. 2 is an elevation of the unit shown in Fig. 1.

The spring unit A shown in Figs. 1 and 2, comprises four individual spring elements $a$, $b$, $c$ and $d$. The element $a$, which may be formed from a spring element blank like the blank X shown in Fig. 3, comprises a helical spring body portion and has integral end portions $a'$ and $a^3$, which extend tangentially from the opposite ends of a helical spring body. The spring elements $b$, $c$ and $d$ may each be a counter-part of the element $a$.

In the assembled unit A, the end $a^2$ of the end portion $a'$ of the element $a$, is attached to the element $b$. As shown, the attachment is effected by tightly coiling the end $a^2$ about overlapping portions of the two top convolutions of the element $b$. The end $a^4$ of the end portion $a^3$ of the element $a$, is similarly secured to the bottom convolutions of the element $d$. In a similar manner, the upper and lower end portions $b'$ and $b^3$ of the element $b$ are connected to the upper portion of the element $c$, and to the lower portion of the element $a$, respectively; the upper and lower end portions of the element $c$ are connected to the top of the element $d$ and to the bottom of the element $b$, respectively; and the upper and lower end portions of the element $d$ are respectively connected to the top of the element $a$, and to the bottom of the element $c$. The end portions and coiled ends of the elements $b$, $c$ and $d$ are designated by reference letters $b$, $c$ and $d$ with exponents like those used with the reference letter $a$ to designate corresponding parts of the element $a$. It will be noted, however, that the lower end portion of the element $c$ and the coiled end of the end portion $d^3$ of the unit $d$, are hidden by parts in front of them in Figs. 1 and 2.

The unit A, formed as described, is a self contained structure in which the upper end portions $a'$, $b'$, $c'$ and $d'$ of the four spring elements unite to form a marginal end frame which is four-sided in form, and is rigidly connected to the four elements $a$, $b$, $c$ and $d$ at the corners of the unit. Similarly, the lower end portions $a^3$, $b^3$, etc., of the elements, unite to form a lower end frame for the unit A which is exactly like the upper end frame, and is similarly connected to the individual spring elements of the unit. Such a spring unit is well adapted for any of the purposes hereinbefore mentioned.

In forming a spring cushion comprising a plurality of units, such as the mattress D shown in Fig. 5, a proper number of units A are arranged side by side, and each unit is advantageously connected at top and bottom to the adjacent units. The spring units are preferably so inter-connected by interlocking integral portions B and C of the end frames of the units. To this end the units shown in Figs. 1, 2, 4, 5 and 6 are formed at two opposing sides with an outwardly bent loop portion B in the plane of the end frame, and the other sides of the frames are formed with bent portions C which initially are in the form of loops bent into open hooks each adapted to receive a corresponding loop B. In the assembled spring structure, the loop hooks C are compressed tightly about the adjacent portions B of adjacent units as shown in Figs. 5 and 6, thus forming a hinged connection in which lost motion is avoided, and which is practically noiseless in use. As indicated in Fig. 4, each unit A at the margin of the spring structure is advantageously formed with end frames having no interlocking loop B or C at its outer or marginal side.

In a preferred mode of forming a cushion such as the mattress D shown in Fig. 4, comprising a plurality of inter-connected units, the latter are inserted in a cloth bag or casing G' of the proper size. On the latter is then built up a suitable cushion filling G of hair, cotton felt or the like, and the springs and filling are enclosed in a suitable casing H of mattress ticking or the like. The spring cushion thus formed may or may not be tufted and tied together in the usual manner, as indicated at $h$.

In Fig. 7, I have shown a spring unit AA composed of elements $a$, $b$, $c$ and $d$, which differs from the unit A in the form if its end frames. In Fig. 7 each wire end frame I is in the form of the outline of a cross, each arm of which is a loop. The inner ends of the legs of each arm forming loop are connected to the inner ends of the legs of similar loops forming the adjacent arms of the cross. Each of said arms extends between the adjacent sides of an adjacent pair of spring elements. Advantageously, and as shown, each end frame I is reinforced at the junctions of its arms by portions of the corresponding end convolutions of the adjacent spring elements which are secured to the end frame members by bent wire portions I'. The ends of said arms may be shaped to serve as interlocking portions B' and C', respectively. In the arrangement shown in Fig. 7, the end frame members I are not integral with the spring elements, and the end portions of the latter are coiled about the corresponding end convolutions of the elements as indicated at $a^6$, $b^6$, $c^6$ and $d^6$. It will be understood, however, that end frames shaped as shown in Fig. 7, may be composed of suitably shaped end portions of the different spring elements.

The unit AB shown in Fig. 8, is formed of two spring elements $a$ and $b$, each of which may be generally like the elements $a$ and $b$ of Figs. 1 and 2. The end portions of the elements $a$ and $b$ in Fig. 8 are shaped to form end frames at the top and bottom of the unit, each of which is a width approximately equal to the maximum diameter of the units, and of a length somewhat greater than twice said diameter. Each end frame is formed with interlocking portions B and C at the ends and sides of the unit.

The unit AC shown in Fig. 9, is formed of two elements $a$ and $b$, as is the unit AB of Fig. 8 from which the unit AC differs in that the end frames IA of the unit AC are not formed by integral end portions of the spring elements, but by separate wires bent into forms corresponding generally to those of the end frames of the unit shown in Fig. 8. The end frames IA are secured to the end convolutions of the corresponding spring units by bent wire portions I', as the frame members I are secured to the spring elements in the unit AA of Fig. 7.

Each unit, formed in any of the ways described above is a self contained, self sustaining structure in which the different spring elements and end frames mutually support one another and contribute to a desirable form stability of the unit as a whole. Since the units do not depend for form or position stability upon lateral contact between the body portions of spring elements the latter need not be cylindrical in outline as is necessary with the cushion and mattress filling springs now commonly used but may be made conical or preferably as shown, may have convolutions at each end of larger diameter than the intermediate convolutions. This is desirable to provide proper spring resistance to different loading weights since as is well known, in a helical spring the stiffness of an individual convolution decreases as the diameter of the convolution increases. In consequence with a helical spring of conical form the convolutions of larger diameter may yield and properly cushion relatively light loads, whereas the convolutions of smaller diameter yield and properly cushion heavier loads. As shown in Figs. 1 and 2, the width of the unit measured between opposing sides of the end frames is less than twice the length of each spring and each end convolution of a spring is separated from an adjacent end convolution portion of each other spring in the unit by a distance less than the end convolution diameter. While the exact dimensions referred to are not essential, the fact that the lateral dimensions of the unit do not greatly exceed and are comparable in order with the depth or spring length of the unit, is a distinguishing characteristic of the invention and contributes to its merit and practical utility.

In the arrangement shown in Figs. 1 and 2, each end convolution is attached to the corresponding end frame at one point, while in the arrangement shown in Fig. 7, each end convolution is attached to the frame at two points. In each of these constructions, however, an arc portion substantially greater than 180° of each end convolution, is free to flex independently of said end frame. In consequence, the end convolutions while supplementing the action of the end frames in carrying the load impressed upon the unit as a whole are nevertheless free to move relative to the end frames and thus provide a certain desirable local flexibility.

While in some cases units comprising but two spring elements as shown in Figs. 8 and 9 may advantageously be assembled and have their end frames connected to form an extended cushion spring structure, for use in a mattress or for like purposes, units consisting of four elements, as shown in Figs. 1 and 2, are ordinarily preferable to units formed of a smaller number of spring elements. For upholstery work, units composed of but two elements are frequently preferable to units composed of a greater number of elements. In upholstery work the different units may have their end frames tied together or not, depending on conditions of use, and particularly upon the form and extent of the cushion section in which the units are employed.

When the units have their end frames tied together the particular form of unit connection illustrated in the drawing is desirable because of its simplicity and strength, the absence of lost motion, the practical impossibility of a relative change in level of the inter-connected parts of any two connected units, and the avoidance of creaking noises when one part of the spring body moves relative to the other. The fact that the connected parts B and C provide hinge-connections between parallel rows of units facilitates the rolling up of the spring structure as may be required, and is highly desirable for storage or transportation purposes when the spring structure is incorporated in a mattress such as that shown in Fig. 4. When the units are arranged in transversely extending rows with hinge connections between the units at the side of the rows as in the preferred construction illustrated the spring structure can be rolled about an axis parallel to the rows of either set.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. A spring unit comprising a plurality of side by side helical spring elements each having integral end extensions, each of said end extensions being attached to the adjacent end of an adjacent element whereby said end portions and the portions of the elements to which they are directly attached form resilient end frames between which the body portions of the elements extend.

2. A four sided spring unit comprising a plurality of helical spring bodies and a resilient end frame to which one end of each element is attached, said end frame having a looped portion at each of the four sides of the unit adapted to cooperate with corresponding looped portions of the end frames of other units to form a spring structure comprising a plurality of said units.

3. A spring structure comprising parallel rows of spring units each of which comprises two or more helical spring bodies and an end frame to which one end of each spring body of the unit is attached, connections between the end frames of units in each row, and hinge-connections between the adjacent sides of end frames of units in adjacent rows.

4. A spring structure comprising parallel rows of spring units each of which comprises two or more helical spring bodies and an end frame to which one end of each spring body of the unit is attached, connections between the end frames of units in each row, and hinge-connections between units in adjacent rows, said hinge-connections connecting the adjacent end frames of the units at both ends of the latter.

5. A spring structure comprising parallel rows of spring units arranged in transversely extending rows, and each comprising two or more helical spring bodies and an end frame to which one end of each spring body of the unit is attached, and hinge-connections between the adjacent end frames of units in each adjacent pair of said rows.

6. A pring unit comprising a plurality of helical springs, a pair of end frames fabricated of substantially the same gage wire as said springs, both ends of each spring being directly connected to said frames interiorly thereof, the size of said unit being such that its greatest lateral dimension does not greatly exceed its depth.

7. A spring unit comprising a pair of resilient end frames and a plurality of helical springs arranged side by side and each connected at one end to one, and at its opposite end to the other of said end frames each said spring having a convolution portion separated from a convolution portion of each of the other springs of the unit by a distance less than the length of said spring.

8. A spring unit comprising a pair of resilient end frames and a plurality of helical springs arranged side by side and each extending between and connected at its ends to said frames, and each said spring comprising a convolution portion separated from a convolution portion of each of the other springs of the unit by a distance less than the maximum diameter of said spring.

9. A spring unit comprising a plurality of helical springs each progressively decreasing in diameter from its ends toward its middle portion, a pair of end frames fabricated of substantially the same gage wire as said springs, both ends of each spring being directly connected to said frames interiorly thereof, the size of said unit being such that its greatest lateral dimension does not greatly exceed its depth.

10. A compact self-sustaining spring unit comprising a pair of resilient end frames, and a plurality of helical spring elements extending between said end frames and each having an end convolution at each end connected at one side of the convolution to the corresponding end frame and comprising an arc portion substantially greater than 180 degrees which is free to flex independently of said end frame.

11. A spring structure comprising a plurality of spring units distributed longitudinally and transversely of said structure and each comprising a plurality of helical springs, a pair of resilient end frames fabricated of substantially the same gage wire as said springs, each end of each spring being directly connected to said frames interiorly therefore, the size of said unit being such that its greatest lateral dimension does not greatly exceed its depth and the end frames of each unit being connected to end frames of adjacent units in the structure.

Signed at Long Island City, N. Y., in the county of Queens and the State of New York this twelfth day of September, A. D. 1927.

LOUIS E. PITTONI.